July 18, 1967     G. O. SINEX     3,331,188
LOW TEMPERATURE GAS DEHYDRATION METHOD
Filed Jan. 25, 1966     2 Sheets-Sheet 1
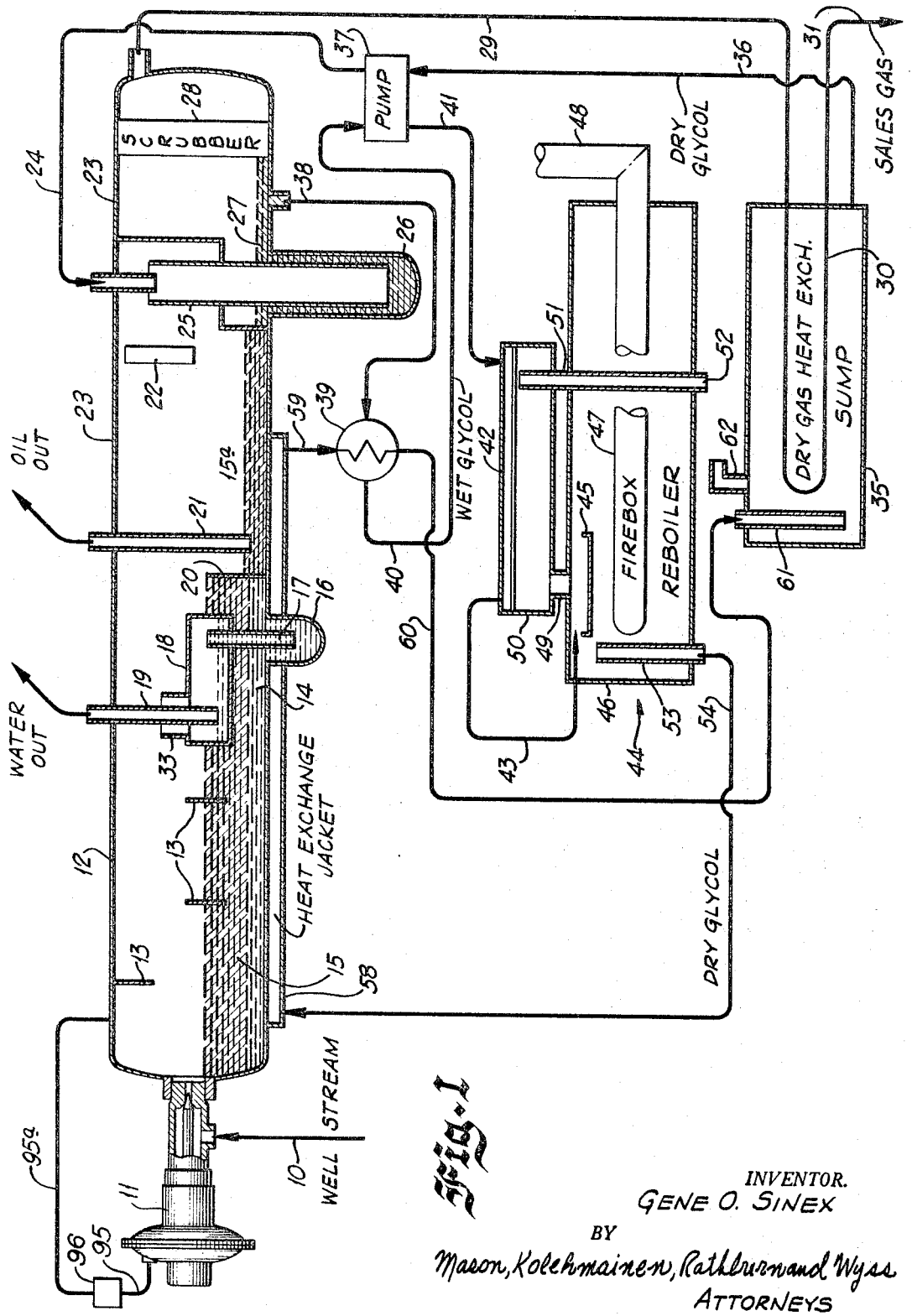
INVENTOR.
GENE O. SINEX
BY
Mason, Kolehmainen, Rathburn and Wyss
ATTORNEYS

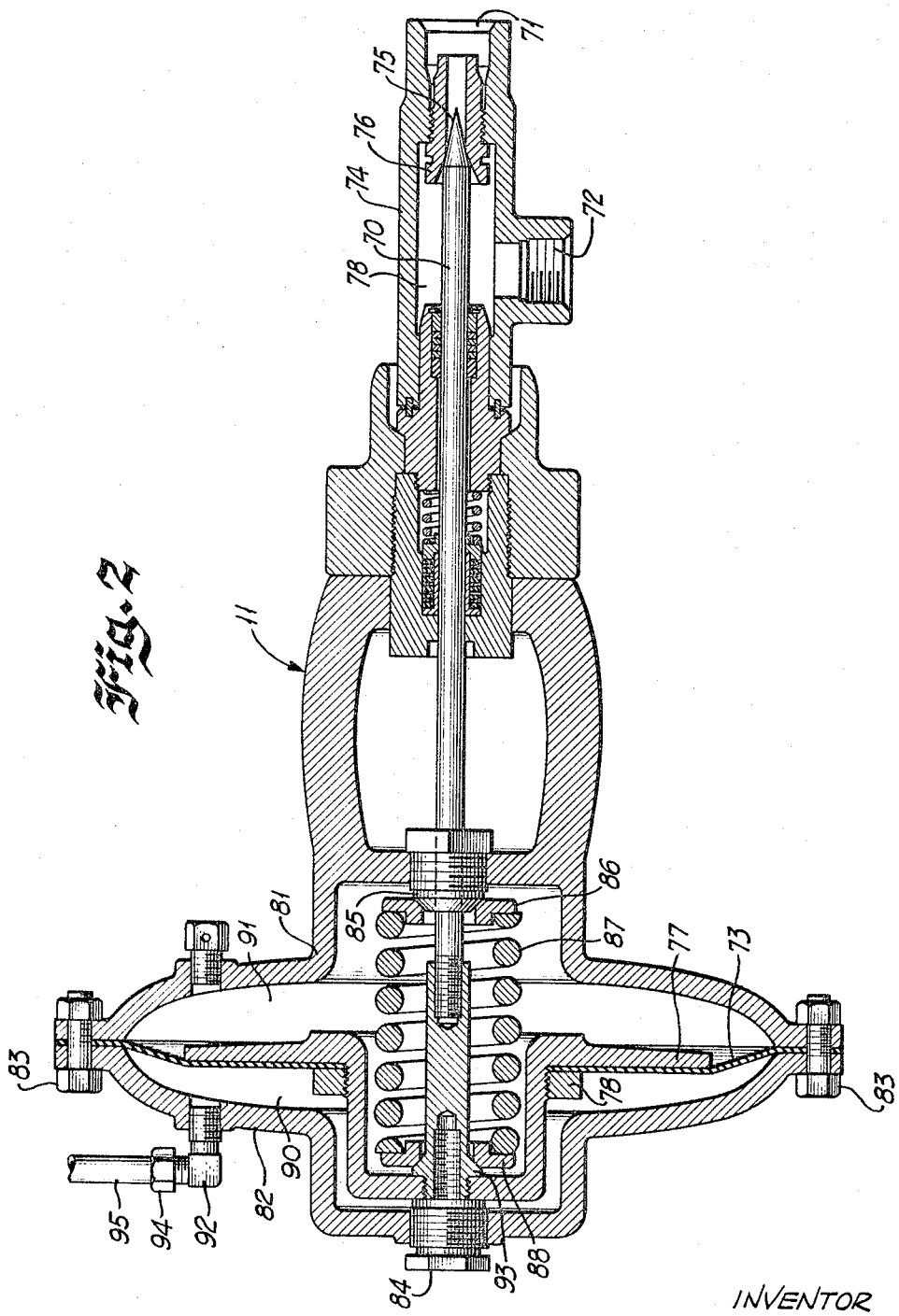

United States Patent Office 3,331,188
Patented July 18, 1967

3,331,188
LOW TEMPERATURE GAS DEHYDRATION METHOD
Gene O. Sinex, P.O. Box 1110,
Farmington, N. Mex. 87401
Filed Jan. 25, 1966, Ser. No. 532,033
4 Claims. (Cl. 55—31)

This application is a continuation-in-part of my copending application Serial No. 279,370, filed May 10, 1963, and now abandoned, which is a continuation-in-part of my prior application Serial No. 643,472, filed March 1, 1957, now Patent No. 3,132,987, granted May 12, 1964.

This invention relates to a method of dehydrating gas streams, particularly natural gas well streams. More specifically, this invention relates to the method for removing water and oil from natural gas streams by separation of entrained water and oil followed by extraction of dissolved water with a nonvolatile, water-miscible solvent, and to apparatus suitable for this method of dehydration of gas streams.

Natural gas as obtained at the well head commonly contains oil as well as dissolved and entrained water. The oil and water must be removed from the gas stream before it is collected or distributed through pipe lines for commercial use because in transportation the gas is often subjected to low temperatures under which the oil and water would separate out and plug the gas lines. Water must also be removed from the gas in order to avoid the formation of hydrates which also plug gas lines and to avoid rust and corrosion of pipe lines, tanks and other equipment used in transporting and storing the gas.

It is an object of this invention to provide an efficient and effective method of removing moisture from low temperature gas streams by separation and extraction. It is another object to provide a method of removing water and oil from low temperature hydrocarbon gas streams by separation and extraction. A further object is to provide a method for dehydration of gas streams which is operative under high and low pressures as well as high and low temperatures so that it is applicable to natural gas streams under a variety of conditions. It is a further object to provide apparatus for separating water and oil from gas streams and removal of dissolved water by extraction therefrom. These and other objects are apparent from and are achieved in accordance with the following disclosure.

Briefly, the present invention comprises a procedure whereby a gas stream at low temperature (0° to 30° F.) and ordinary pressure suitable for pipeline transmission is treated in a separator whereby entrained insoluble materials contained in the gas stream, such as oil, hydrates and water, settle out. The water and hydrates are collected in a heated sump and discharged by a pilot-operated level controller while the oil floats on top of the water and is removed by overflowing a weir into another compartment where it is discharged by a pilot-operated level controller. The cold gas stream at 0° to 30° F. from which the entrained oil and water have been separated is then passed into a low temperature contactor where a nonvolatile, water-miscible solvent, such as a glycol, in substantially anhydrous condition is admixed with the gas stream and passes concurrently through the contactor where it is intimately contacted with the gas and absorbs water vapor therefrom. The gas stream is separated from the solvent and passes through a wiremesh scrubber which removes any liquid entrained therein. The dry gas passes out of the dehydrator and can be passed through a heat exchanger to bring the gas to ambient temperature if desired. The solvent from the dehydrator contains water and is at low temperature (0° to 30° F.). It is passed through a heat exchanger to bring its temperature close to ambient temperature and reduce its viscosity. It then is passed through the power side of a solvent pump where its energy (plus that of a small volume of gas) is used to operate the pump which circulates substantially anhydrous solvent from the reboiler through the contactor. From the solvent pump the wet solvent is circulated to a reboiler where moisture is removed at high temperature, and the anhydrous solvent from the reboiler is collected in a sump. This solvent can then be recirculated to the dehydrator for further extraction of moisture from the gas stream.

In a preferred modification of this procedure, hot dry solvent from the reboiler is passed through a heat exchanger which is in contact with the bottom part of the separator so that the heat of the solvent can be utilized to melt any ice or hydrate which collects in the water phase at the bottom of the separator. This heating operation prevents freezing or solidification of liquids within the separator during their gravity separation and aids in the separation of any oil-water emulsions. After passing out of the foregoing heat exchanger, the warm dry solvent then passes through another heat exchanger to provide heat to the cold wet solvent received from the dehydrator unit. This heat reduces the viscosity of the solvent so that it flows readily and can be used to operate the solvent pump. The warm dry solvent from the second heat exchanger is then returned to the sump for storage prior to return to the dehydrator.

The invention, together with further objects and advantages thereof, may be better understood from the following description taken in conjunction with the accompanying drawings in which:

FIG. 1 is a schematic diagram illustrating the combination of separator, dehydrator, reboiler, heat exchangers and pump; and FIG. 2 is a sectional view of the pressure-controlled choke used in reducing pressure of the well stream prior to entering the separator.

Referring now to FIG. 1 of the drawings, a high pressure natural gas well stream enters the system via a line 10 and passes through a pressure-controlled choke 11 into a separator 12. The pressure of the gas stream is substantially reduced by the choke and the temperature of the gas falls to the range from 0° to 30° F. The separator is a cylindrical horizontal tank containing baffles 13 which constitute a scrubbing element which interrupts the flow of gas and increases the efficiency of the separator. Entrained particles of oil, water and hydrates in the gas stream are mechanically removed from the gas and collect at the bottom of the separator, the water being represented by the lower phase 14 and the oil by the upper phase 15. Water collects in a sump 16 and as the liquids collect in the bottom of the separator the pressure created thereby forces the water up to conduit 17 into a tank 18 where water is collected and drawn off periodically through a line 19 under pressure supplied by the gas stream. An upstanding baffle 33 on the tank 18 prevents admission of oil or water particles to said tank. The layer of oil 15 on top of the water 14 accumulates until it overflows a weir 20 and collects at the bottom of the right hand chamber 32 of the separator as a layer 15a. The oil layer 15a is drawn off through a conduit 21 periodically under pressure supplied by the gas stream. The cold gas stream passes from the separator 12 through a scrubber 22 which removes entrained particles into the dehydrator section 23 of the apparatus. A stream of substantially anhydrous dehydrating liquid, such as a glycol, is injected into the dehydrator section 23 via a line 24 and descends a contactor 25 concurrently with the gas stream. The upper end of the contactor 25 constitutes a cylindrical gas and liquid contact column and, in order to provide an extended surface on which contact between gas and glycol occurs, the column can be filled with a stack of disks of expanded metal which provides a surface over which the glycol is circulated in contact with the gas stream. Alternatively, the internal portions of the contactor 25 may be suitably provided with loose packing such as wire mesh, glass fibers or similar contacting material to increase the time and area of contact between the stream of anhydrous glycol and the gas stream in the contactor 25. The water vapor in the gas is absorbed by the glycol and the diluted or wet glycol flows downwardly in the contactor 25 and collects in a sump 26. Glycol which collects in the sump overflows into the bottom of the dehydrator 23 and forms a pool 27 from which glycol (with absorbed moisture) is removed via a line 38. The dry gas passes upward from the sump 26, through a scrubber 28 which removes any entrained liquid from the gas, and out of the dehydrator 23 via a line 29. Any liquid removed by the scrubber 28 flows back into the pool 27. The dehydrated gas stream in the line 29 is suitable for commercial distribution. In ordinary operations, it is at relatively low temperature so it is advantageous to pass it through a heat exchanger 30 disposed within the glycol sump 35 which derives its heat from the warm glycol of the reboiler as disclosed below. The warm gas stream passes out of the heat exchanger 30 via a line 31 for commercial sale and distribution.

The glycol dehydration section is best described with reference to FIG. 1, beginning with the anhydrous glycol stored in the glycol sump 35. Anhydrous glycol is removed from this sump via a line 36 which is connected to the suction end of a glycol pump 37 from which the glycol is pumped via the line 24 into the contactor 25. The wet glycol from the dehydrator collects in the pool 27 and is removed via a line 38 and passes through a heat exchanger 39 wherein the wet glycol is warmed to about 70° F. to reduce its viscosity. The warmed glycol passes out of the heat exchanger 39 via a line 40 and returns to the power side of the pump 37 where its energy (plus that of a small amount of gas from the dehydrator) is used to operate the pump 37 and circulate glycol from the sump 35 to the dehydrator 23. The wet glycol flows from the pump 37 via a line 41 to a heat exchanger 42 which derives its heat from hot vapors in a glycol vapor absorber 50 which is part of the reboiler unit described below. The wet glycol flows from the heat exchanger 42 via a line 43 into the reboiler 44 where it is fed onto a tray 45.

The reboiler 44 includes a tank 46 in which is positioned a fire box 47 in which is located a burner (not shown) of the long flame type. The fire box 47 is connected with a flue 48 and provides heat for the reboiler. The wet glycol which enters the reboiler via the line 43 is discharged onto a tray 45 above the fire box and is rapidly heated to a temperature above the boiling point of water. The water in the wet glycol flashes off and passes upwardly with some glycol vapor through a conduit 49 to a glycol vapor absorber 50 which is in contact with the heat exchanger 42 containing cool wet glycol from the glycol pump 37. The flashing of the water vapor is advantageous because a large portion of the vapor thus formed passes through the glycol absorber 50 and out through the conduit 51 without being mixed with the glycol in the boiler 46. All of the glycol is liquefied in the glycol vapor absorber 50 (which can be the type described in my Patent No. 3,132,987) and returns to the reboiler via the conduit 49 while the water vapor passes out through a heat exchange conduit 51 which vents to the atmosphere via an opening 52. The water vapors are superheated in the heat exchange conduit 51 by means of heat from the reboiler 44 before being discharged to the atmosphere. This feature of superheating the water vapors prevents freezing at the vapor outlet 52 during cold weather. Any noncondensible gas in the wet glycol is also vented through the outlet 52.

The warm concentrated (dry) glycol collects in the reboiler tank 46. The height of an upstanding conduit 53 determines the liquid level within the tank 46 and maintains it above the level of the firebox 47. The dry glycol is removed from the tank 46 by the conduit 53 and a line 54 to the heat exchanger 58 attached to the bottom section of the separator 12. The glycol which passes out of the heat exchanger 58 is still fairly warm and has sufficient energy to release in the heat exchanger 39, to which it passes via a line 59, to warm the cold wet glycol entering the heat exchanger 39 via the line 38. The dry glycol then leaves the heat exchanger 39 via a line 60 through which it is returned to the sump 35 via an inlet conduit 61. A sump vent 62 is provided on the sump 35 for release of excess pressure. From the sump 35 the dry glycol passes again into the suction end of the pump 37 and through the dehydrator 23.

FIG. 2 illustrates the choke 11 which comprises a needle valve for controlling the flow of gas into the large orifice 71 and is controlled by a pressure-sensitive diaphragm 73. The choke 11 has an inlet orifice 72 suitably threaded for conection to the pipe line 10 from the well head. The inlet orifice connects with the substantially cylindrical housing 74 which defines an annular space 78 around the valve stem 70, which space is filled with gas. The valve stem 70 has a needle point 75 which is machined to fit a valve seat 76 which is fitted into the housing 74 in the outlet orifice 71 of the choke 11, thereby forming a needle valve. The orifice 71 is connected directly to the separator 12 by suitable fittings (not shown). The motion of the needle valve 75 with respect to the valve seat 76 is controlled by a pressure-sensitive diaphragm 73 which is attached to a plate 77 by means of an annular ring 78 affixed to said plate by means of screws (not shown). The plate 77 is attached to the upper end of the valve stem 70 by means of thread or other suitable connection. The outer end of the diaphragm 73 is attached to a circular housing 81 which in turn is connected to the valve housing 74. A bonnet 82 is attached to the housing 81 by means of bolts 83. A screw cap 84 in the center of the bonnet 82 acts as a bumper for the plate 77. A pivot 85 and a spring plate 86 carry a helical compression spring 87. The pivot 85 encircles the valve stem 70 and is supported by the bottom of the housing 74. A second spring plate 88 is supported by a pivot 93 attached to the central portion of the plate 77. The housing 81 and bonnet 82 define two closed spaces 90 and 91 which are separated by the diaphragm 73 and the plate 77. An inlet elbow 92 is tapped into the wall of the bonnet 82 and connects to the inner space 90. The elbow 92 is suitable tapped and threaded so as to form a gas tight joint with the bonnet 82. The elbow 92 has suitable pipe connection 94 to form a gas-tight joint with a pipe line 95 connected to the separator 12 by suitable pipe fittings (not shown). The pressure of the gas in the space 90 is equalized with the pressure in the separator 12 by means of the line 95, pressure controller 96, and line 95a. As pressure in the separator 12 increases, the pressure in the space 90 increases and forces the diaphragm 73 in the direction of the valve seat 76, thereby closing the needle valve formed by the needle point 75 and the valve seat 76, thus cutting down or stopping the flow of gas from the inlet orifice 72 to the outlet orifice 71 and decreasing or terminating the flow of gas into the separator 12. As the flow of gas into the separator 12 is decreased, the pressure in the separator 12 decreases and the pressure in the annular space 90 likewise decreases. Consequently, the force applied to the diaphragm 73 decreases, thereby allowing the spring 87 to force the plate 77 and diaphragm 73 toward the bonnet 82. The motion of the plate 77 causes the valve stem 70 and needle valve point 75 to move away from the valve seat 76, thus opening the needle valve and allowing gas to flow from the inlet orifice 72 through the annular space 78 into the outlet orifice 71 and to the separator 12, increasing pressure in the latter. By means of the pressure controlled choke 11 it is possible to maintain appropriate pressure in the separator 12 by adjusting the relative size of the diaphragm 73 and the compression strength of the spring 87 for any well head pressure.

The pump 37 is a "PV Series" glycol pump manufactured by Gimray, Inc., of Oklahoma City, Okla., and described in the Kimmell Patent No. 2,990,910, July 4, 1961. It is a double-acting pump powered by the high-pressure glycol from the pool 27 and a small amount of gas from the dehydrator 23. The pump is symmetrical in design and contains corresponding cylinders, pistons, dry glycol inlets and dry glycol discharge means on both the right side and the left side, with appropriate suction check valves and discharge check valves in the inlet and discharge lines. While the piston is operating on the left side of the pump the corresponding piston on the right side of the pump operates in the reverse order. The energy contained in the wet glycol as it comes from the dehydrator under relatively high pressure via the line 40 is expended on the large outer faces of the pistons. In actual practice, a small amount of gas from the dehydrator 23 also enters the glycol pump with the wet high pressure glycol. This gas is under the same pressure as the glycol and corresponds to the pressure in the dehydrator. By reason of the fact that the inner surface areas of pistons are smaller than the outer surface areas, the glycol moving through the pump can be at a pressure equal to or slightly greater than that in the absorber 23, thereby allowing the glycol to be injected into the absorber via the line 24 at a pressure higher than that existing in the absorber.

The invention may be more fully understood and more specifically illustrated by the following example which describes the operating conditions of an actual commercial dehydration procedure. It will be understood by those skilled in the art that various modifications in operating conditions can be made within the disclosure of this specification without departing from this invention.

A well stream of natural gas at a flow pressure of 1760 p.s.i. and a flow temperature of 70° F. passes into the dehydration system via the line 10 at a flow rate of 500,000 s.c.f.d. The choke 11 reduces the pressure of the gas as it enters the separator 12 to 450 p.s.i. and concurrently reduces the temperature to about 15° F. by reason of expansion of the gas. Entrained water and oil collect in the bottom of the separator 12. The gas from the separator 12 from which oil and water have been removed passes to the contactor 25 at 450 p.s.i. and approximately 15° F. Dry glycol from the sump 35 at 75° F. is injected at a rate of 20 gal./hr. into the contactor 25 at a pressure greater than 450 p.s.i. The gas and glycol descend the contactor and are separated in the sump 26. The gas passes upward in the sump, through the scrubber 28 and out of the dehydrator by way of the line 29, still at a temperature slightly above 15° F. By means of the heat exchanger 30 the dehydrated gas passing through the line 29 is raised to a temperature of 50° F. and passes out of the apparatus by a gas sales line 31 for commercial use.

The glycol 27 which is collected at the bottom of the dehydrator 23 is removed by a line 38 at a temperature of about 25° F. After passing through the heat exchanger 39 its temperature is raised to about 70° F. and its viscosity is sufficiently reduced for operation of the glycol pump 37. After the wet glycol has passed through the pump 37 it enters the heat exchanger 42 attached to the glycol vapor absorber 50 where it absorbs heat before it enters the reboiler 44. Water vapor is removed from the glycol in the reboiler 44 and concentrated hot glycol collects in the tank 46. Warm dry glycol from the reboiler 44 at a temperature of about 300° F. passes via the line 54 to the heat exchanger 58 attached to the bottom part of the separator 12. After passing through the heat exchanger and liberating some of its energy to melt any ice and hydrates formed in the water 14 in the separator 12 (and raising the temperature of the water 14 to about 65° F.), the glycol at a temperature of about 225° F. passes via line 59 to the heat exchanger 39 where it gives up further heat to the cold wet glycol which enters the heat exchanger via the line 38. The dry warm glycol which emerges from the heat exchanger 39 at a temperature of about 160° F. passes via line 60 to the sump 35 where it is stored. The glycol contained in the sump 35 is of sufficient temperature to warm the dry cold gas which passes out of the dehydrator via line 29. This operation also aids in cooling the dry glycol ahead of the contactor 25. The dew point of the gas stream is reduced at least 65° F., and commonly 90° F., by treatment as described above.

In a typical installation of the type described herein, the cylindrical vessel which comprises the separator 12, the chamber 32 and the dehydrator 23 is six feet long and twelve and three-quarters inch internal diameter designed to operate at a pressure of 500–1500 p.s.i. The reboiler 44 has a capacity of 50,000–100,000 B.t.u. per hour. The glycol pump is a Kimray No. 4015 PV pump which operates at a capacity of 20 gallons per hour using triethylene glycol as the dehydrating liquid and the water and oil are removed from the separator at a rate of 5 barrels per day. A charge of glycol equivalent to thirty gallons is placed in the sump 35.

The pressure controller 96 is preferably a Fisher Wizard pressure controller, Type 4102 UR, manufactured by Fisher Governor Company, Marshalltown, Iowa, or an equivalent controller.

While the procedure described herein has been applied to a well stream at high pressure and has included the step of reducing the pressure of the gas stream upon entering the separator, thereby cooling the gas stream, the procedure is equally applicable to gas streams at low pressure and temperature which do not require further pressure reduction on admission to the separator. The procedure and apparatus described herein are operable on any low temperature gas stream. In fact, that is one of the major advantages of this system. It is versatile and can be applied to low temperature gas streams under a wide variety of conditions. Furthermore, the method and apparatus are operative under a wide variety of climatic conditions including temperatures below freezing which are often encountered in the Rocky Mountain areas.

I claim:
1. Method of purifying and dehydrating a gas stream containing water vapor and entrained particles of undissolved oil and water, which comprises passing said gas stream at a temperature in the range from 0° to 30° F. through a separator vessel having baffles contained therein which interrupt the flow of gas and cause precipitation of entrained particles of undissolved materials, then contacting said gas stream in a contactor vessel with a concurrent stream of a dehydrating liquid by flowing said liquid downwardly over a contacting surface whereby said liquid is in continuous contact with the concurrent gas stream, separating the liquid and gas streams, passing the gas stream through a scrubber in which entrained particles of the dehydrating liquid are removed, thereby producing a gas stream substantially free of water vapor and entrained particles, removing the cold dehydrating liquid containing water from the contactor vessel and passing said liquid through a first heat exchanger to heat it and reduce its viscosity, conducting said heated liquid to the power side of a fluid-operated double-acting pump to provide energy to operate said pump, collecting said heated liquid at the discharge side of said pump, evaporating water from said liquid by heating it at a temperature above the boiling point of water and separating water vapor from the heated dehydrating liquid, flowing the hot reconcentrated dehydrating liquid through a second heat exchanger in contact with the bottom of said separator vessel to impart heat to the undissolved materials collected therein and melt any ice and hydrates contained therein, thereafter flowing the reconcentrated dehydrating liquid to the first heat exchanger to impart heat to the cold wet dehydrating liquid, flowing said reconcentrated dehydrating liquid to a storage vessel for recirculation, withdrawing reconcentrated dehydrating liquid from said storage vessel by means of said fluid-operated double-acting pump and recycling said liquid to said contactor vessel for dehydration of the gas stream.

2. Method of claim 1 wherein the dehydrating liquid is a nonvolatile, water-miscible, organic liquid.

3. Method of claim 2 wherein the organic liquid is a glycol.

4. Method of claim 3 wherein the gas stream is at a pressure in the range from 500 to 1500 p.s.i. in the separator vessel.

References Cited

UNITED STATES PATENTS

| | | | |
|---|---|---|---|
| 2,990,910 | 7/1961 | Kimmell | 55—32 |
| 3,094,574 | 6/1963 | Glasgow et al. | 55—31 |
| 3,119,674 | 1/1964 | Glasgow et al. | 55—20 |
| 3,174,926 | 3/1965 | Walker et al. | 55—174 |
| 3,182,434 | 5/1965 | Fryar | 55—32 |

REUBEN FRIEDMAN, *Primary Examiner.*

SAMIH N. ZAHARNA, C. N. HART,
*Assistant Examiners.*